Jan. 9, 1951

R. R. LAW 2,537,769

FREQUENCY CONTROL

Filed April 2, 1946

2 Sheets-Sheet 1

INVENTOR
Russell R. Law
BY H. S. Grover
ATTORNEY

FREQUENCY CONTROL

Filed April 2, 1946 2 Sheets-Sheet 2

INVENTOR
Russell R. Law
BY H. S. Grover
ATTORNEY

Patented Jan. 9, 1951

2,537,769

UNITED STATES PATENT OFFICE 2,537,769

FREQUENCY CONTROL

Russell Robin Law, Princeton, N. J., assignor to Radio Corporation of America, a corporation of Delaware Application April 2, 1946, Serial No. 658,896

11 Claims. (Cl. 250—36)

This application discloses an improved method of and means for controlling or stabilizing the frequency of radio frequency devices, and is well adapted to use with devices operating at ultra high frequencies.

The general object of the present invention is to improve methods and means for controlling or stabilizing the frequency of operation of ultra high frequency devices.

The method and means of the present invention is of wide use in the radio and allied arts. For example, in receivers of the heterodyne type it is desirable that the oscillator cooperating with the converter for frequency changing purposes be of substantially constant frequency. Likewise, if the timing of an oscillation generator is to be modulated or if ultra high frequency energy being translated in a circuit or tube stage is to be modulated in timing it is essential that the average frequency of the generated oscillations or energy being translated be maintained constant. The method and means of the present invention is well adapted for such use. Other uses of stabilized oscillations will be apparent to those skilled in the art.

This general broad object is attained in accordance with my invention by diverting a portion of the oscillations or signal generated by the controllable frequency oscillator or being translated in a high frequency stage and feeding the same through a high Q resonator to a phase discriminator wherein this signal is compared as to phase with the original signal and the phase differences between the two are employed to control the frequency of the controllable frequency oscillator or translating stage in such a manner that the two signals shall remain in phase. In the method and means then of my invention in a sense it may be said that phase comparison and degenerative control is used to maintain ultra high frequency oscillatory energy of substantially constant frequency. The phase discriminator is similar in many respects to the phase comparer or detector of my U. S. application Serial #551,296, filed August 26, 1944. Said application ripened into Patent #2,503,394 on April 11, 1950.

Since the control or stabilizing effect is initiated by comparison of the phases of two voltages the control is entirely independent of amplitude variation or modulation effects over a wide range of amplitude variation or modulation. Therefore the method and means of my present invention is especially adapted for use in stabilizing a wave generator or wave translating circuit wherein the wave energy is to be modulated in amplitude. Then my improved means may be operated in a degenerative sense to wipe out and prevent concomitant timing or phase or frequency modulation.

In describing the details of my method and means as outlined generally hereinbefore, reference will be made to the attached drawings wherein Fig. 1 illustrates schematically and by the use of rectangles, in some cases, a phase comparing or detecting tube of the general nature described in my above identified application, a source of oscillatory energy the frequency of which is to be controlled and two paths connecting said source to the two pairs of deflecting electrodes in the tube, one path including a resonator and the other a delay network, all arranged in accordance with my invention.

Figure 1:
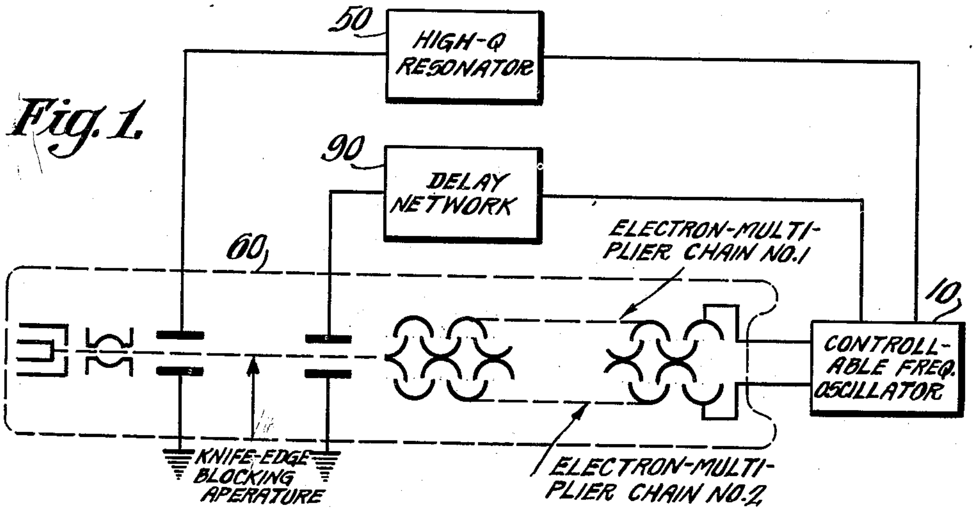

In Fig. 1 the rectangle 10 is to include a controllable frequency oscillator. Oscillatory energy from the oscillator therein is fed by a high Q resonator 50 to the first deflecting plates in a cathode ray tube 60. The cathode ray tube 60 has a second pair of deflecting electrodes also coupled by a delay network 90 to the oscillator in 10. The cathode ray tube 60 has an electron beam emitting electrode and a knife edged blocking aperture between the pairs of deflecting electrodes and two electron multiplying electrode chains connected as described more in detail hereinafter to the oscillator in unit 10 for stabilizing its frequency.

Figure 4:
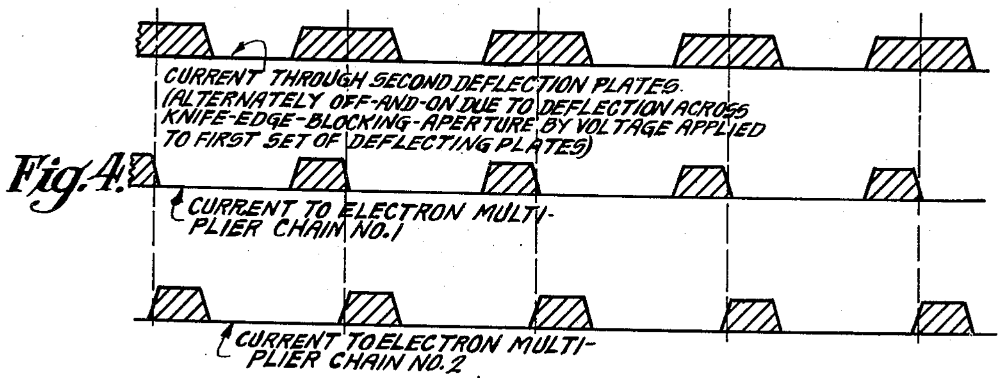
Fig. 4 illustrates graphically the manner in which the circuit arrangement of Figs. 1 and 2 operates to compare the phase of the two energies and to produce currents the relative intensities of which depend on the phases of the currents and for utilizing said currents to control the oscillator.

In operation the controllable frequency oscillator in unit 10 may be loosely coupled to a high Q resonator in unit 50 and at the same time the oscillator is coupled through a suitable delay network in unit 90 to the second set of deflecting plates of the special beam deflection phase discriminator tube 60. The first set of deflecting plates of this special beam deflecting phase discriminator tube is also loosely coupled to the high Q resonator in unit 50. If the controllable frequency oscillator in unit 10 were operating at the resonant frequency of the high Q resonator in 50, the voltages across the first and second sets of deflecting plates would be in phase were it not for the delay in the coupling between the oscillator in 10 and the resonator in 50, and between the resonator in 50 and the deflecting plates of the tube 60, and the couplings between the oscillator in 10 and the delay network in 90, and between the delay network in 90 and the second pair of deflecting plates, and in the delay network. However, if the delay network is so adjusted that there is a net delay of 90 electrical degrees between the voltages supplied to the two pairs of deflecting plates, the beam current will be equally divided between the two multiplier chains #1 and #2 of the special tube 60. Thus the current through the second deflecting plates will be as illustrated on the top line of Fig. 4 of the drawings. The current through the second deflecting plates will be interrupted at equal time inetrvals, i. e., will be alternately on and off due to deflection of the beam across the knife edged blocking aperture due to the alternating voltage applied to the first set of deflecting plates. The second deflecting plates excited by the alternating currents occurring 90 electrical phase degrees later than the currents on the first deflecting plates will sweep the beam back and forth across the initial plates (anodes) of the electron multiplier chains so that each thereof will be excited by beam energy pulses of like duration and the multiplier chain outputs will be of equal average constant intensities as described more in detail hereinafter and in said aforementoined application. The beam current to the amplifier chains is represented by the second and third lines in Fig. 4. At this time the controllable frequency oscillator 10 will not be subjected to correcting potentials and will be assumed to be operating at its mean or average frequency.

Figure 5:
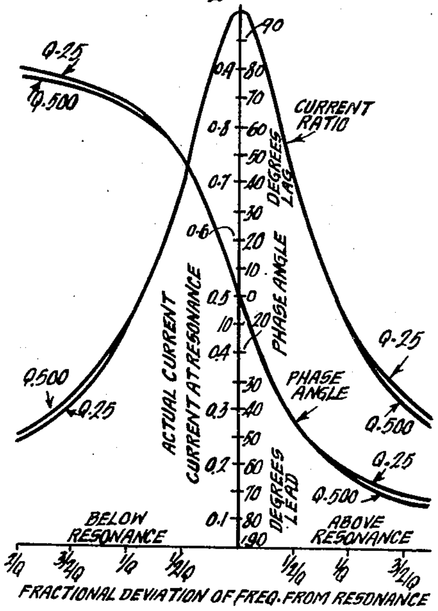
Fig. 5 illustrates by curves the resonance characteristic of the cavity resonator in one of the feedback paths.

Suppose, however, that the controllable frequency oscillator in unit 10 tries to speed up. As indicated in Fig. 5 the high Q resonator in unit 50 will then look like a capacitance (tuned to resonance at a frequency lower than the excitation frequency) and the phase of the signal applied to the first set of deflecting plates will be relatively shifted and differ from the phase of the voltage applied to the second deflecting plates by more than the original 90°. Assume the phases of the voltages on the deflecting plates are such that the said phase change relatively advances the voltage on the first deflecting plates DP. The beam current to the multiplier chain #1 will now increase because the current pulses through the second deflecting plates will be relatively advanced in time and the distribution of the beam current pulses to the electron multiplier chains #1 and #2 will no longer be equal and the beam current supplied to multiplier chain #1 will increase, while that to multiplier chain #2 will decrease. Thus the average direct current component in the multiplier outputs will vary differentially with that in the output of multiplier chain #1 going up and that in the output of the multiplier chain #2 decreasing. The arrangement of the frequency control of the oscillation generator in unit 10 is such as to slow the oscillator down to reestablish a quadrature relation between the voltages on the pairs of deflecting plates. Conversely, if the controllable frequency oscillator in 10 tends to slow down the high Q resonator in unit 50 will look like an inductance (tuned to resonance at a frequency higher than the excitation frequency), and the phase of the signal supplied to the first set of deflecting plates will be relatively retarded so that the phase displacement between the voltages on the first and second deflecting plates will now be less than 90° and the current pulses through the second deflecting plates will be retarded or take place later in time than illustrated in the first line of Fig. 4 so that the distribution of the electron beam through the tube on the input plates of the amplifier chains #1 and #2 will again be unequal with more beam current being supplied to the amplifier chain #2 and less current being supplied to the amplifier chain #1 so that the average direct current components of these amplifiers will again vary differentially, with the output of chain #1 decreasing and the output of multiplier chain #2 increasing to speed up the oscillator in the unit 10 to reestablish the quadrature relation between the voltages on the first and second sets of deflecting plates.

In this manner the outputs of the two multiplier chains operate to stabilize the controllable frequency oscillator in unit 10 in such a way as to correct the frequency thereof and make it return to the median condition, which in the present case is the point where the oscillator frequency is equal to the resonant frequency of the high Q resonator in 50.

While it is believed that my invention in all its essential aspects has been made clear to those versed in the radio and allied arts to which this disclosure is directed, I will now describe details of the essential elements and circuit arrangements of certain components of my system. In doing this reference will be made to Fig. 2 of the drawings.

Figures 2, 3:
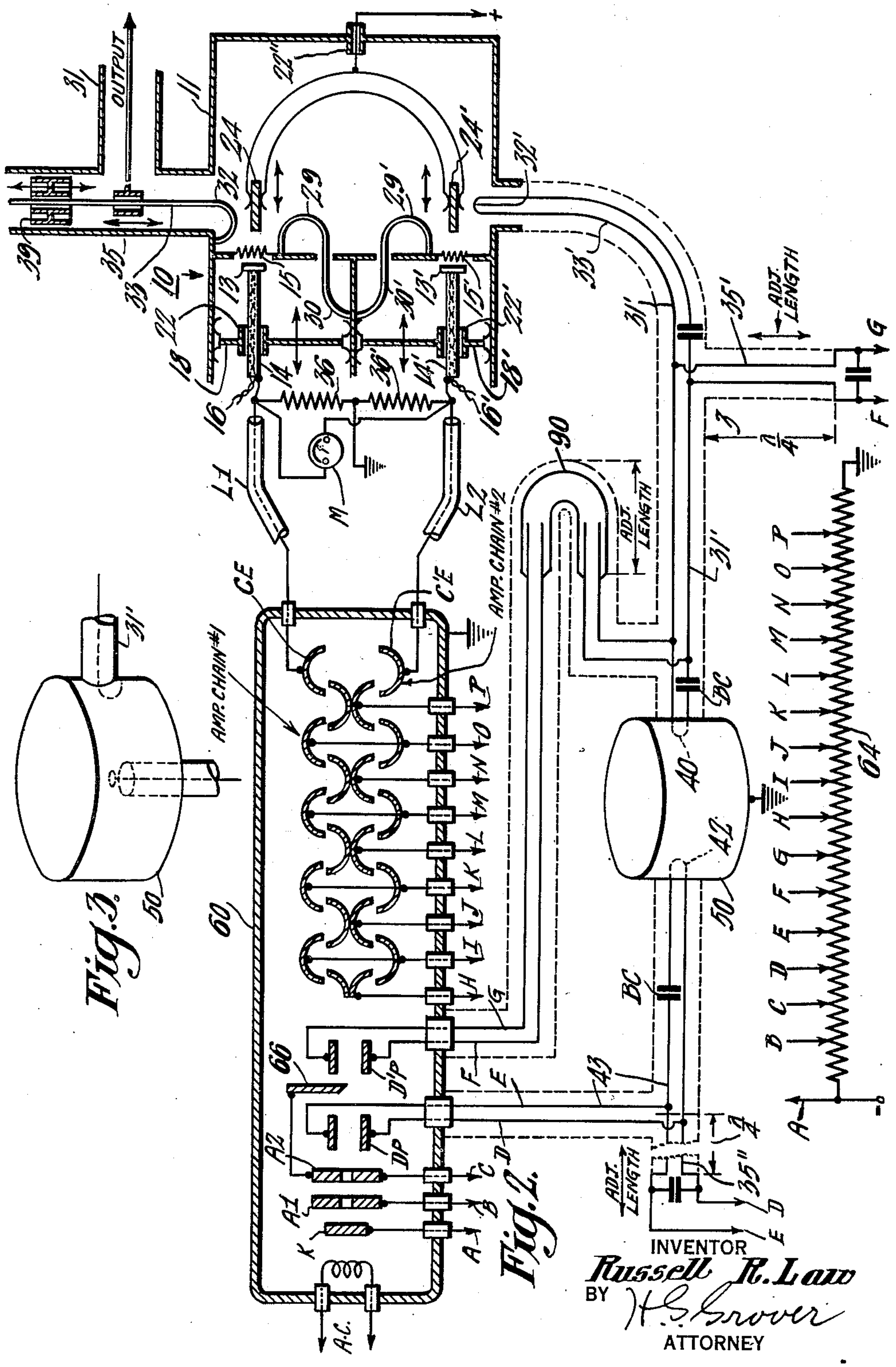
Fig. 2 illustrates by circuit element and circuit element connections the essential features of an ultra high frequency oscillatory energy stabilizing system arranged in accordance with my invention.
Fig. 3 illustrates details of a cavity resonator used in the arrangement of Figs. 1 and 2.

In Fig. 2 the generator is designated generally at 10. This generator has an output circuit from which the useful alternating current or power may be derived. The generator also has a circuit 31′, 33′, by means of which generated energy is diverted and fed back to the resonant circuit 50 and delay network 90. The improved generator utilizes two novel tube structures arranged in and cooperating with enclosed spaces forming with the tubes and electrodes cavity resonators operating at different frequencies. The generators comprise a closure member 11 providing spaces wherein the cathodes 13 and 13′, the control grid electrodes 15 and 15′, and anode electrodes 24 and 24′ are enclosed. The cathodes may be carried by or integral with hollow tube leads 14 and 14′ which pass through walls of the closure member. Cathode heating current may be supplied by leads 16 and 16′ in the hollow tubes 14 and 14′. The closure member 11 is shown as being of metal but may be of other material having an inner surface coated with conducting material. The control grid electrodes 15 and 15′ may be continuations or extensions of the walls of the space closure member 11. The member 11 may have a section (in a plane perpendicular to the paper) of any appropriate shape such as square, rectangular, or circular, oval, etc.

In these cavity resonators, as is well known, the frequency of operation depends primarily on the mode of operation, the dimensions and shape of the chamber, the L and C thereof, and to some extent on the energy losses in the system per cycle of generated energy. The area in which the cathode 13 is located is dimensioned, and the mode of operation is such that the cathode 13 is in a resonant circuit operating at a frequency $f1$ below the mean frequency at which the two generators are entrained. Openings in the cavity introduce energy losses and the chambers are as nearly completely closed as possible. Adjustable tuning means, however, are desirable. Plugs introduced in the cavities change their dimensions and are a practical means of adjusting the frequency of operation. Separate tuning plugs may be adjustably introduced in the space for tuning purposes. In my improved system the plunger members 18, 18′ serve the multiple purposes of adjustable tuning means, chamber wall, and means for introducing the cathode heating and cathode excitation leads into the cavities and also complete the high frequency tuned cathode circuits for the oscillators. Tuning of the cathode cavities is accomplished by sliding plungers 18 and 18′. The members 18 and 18′ have contact fingers which bear on the walls of the closure member 11 as the members 18 and 18′ are moved to vary the dimensions of the resonant chambers to tune the oscillators. The contact fingers provide low impedance connections between the relatively movable portions of the resonant chambers. As to the high frequency currents the couplings between flanged openings 22, 22′ and 22″ and the leads passed therethrough may be considered short circuits.

Where tuning plugs are used, introduction of the plug may increase or decrease the frequency of operation, depending on the position of the plug in the electrostatic and electromagnetic field. In the embodiment illustrated, movement of the members to reduce the cavity dimensions increases the frequency of operation of the oscillators.

In the manner described above, the cathode 13′ is arranged to operate in a tuned circuit resonant at a frequency $f2$, differing in the other direction from the mean frequency by an amount equal to the difference between the mean frequency and the frequency $f1$.

The anodes 24 and 24′ are mounted adjacent the respective grids 15 and 15′. Resilient movable contact fingers cooperate with the anodes for tuning the anode circuits of the oscillators, tuning being accomplished by adjusting the length of the anode circuits. The anodes of the two discharge devices are coupled in pushpull, and may be considered in a circuit tuned to a band of frequencies covering a range which at least includes $f1$ and $f2$, but is preferably wider than the range $f1$ to $f2$. Loops 29 and 29′ in the anode portion of the cavity feed generated energy back to loops 30 and 30′ in the resonant cathode spaces to provide regeneration at $f1$ in one tuned cathode resonator, and at $f2$ in the other tuned cathode resonator. The impedances, areas and reactances of the loops 30 and 30′ are considered in arriving at the dimensions of the chambers required to tune the cathode circuits to the desired operating frequencies $f1$ and $f2$.

The output circuit including a line 31 may be coupled by transformer means to the anodes of the generators. In a preferred embodiment, I use a line 33, the inner member of which is coupled by a loop 32 into the resonant chamber. The transformer coupling is adjustable by means of a variable coupling 35. The coaxial line 33 is shorted at the outer end for voltage of the generated frequency by an adjustable coupling arrangement 39, at which point the line is of about zero high frequency potential. The end of the loop 32 connected to the chamber 10 is also of low or zero high frequency potential. The loop 32 extracts generated oscillation from the cavity space and feeds the same over line 33 to the output line 31. The manner of arranging this type quarter wave line section transformer is well known in the art. The circuit is equivalent to a parallel tuned auto-transformer, and the voltage may be stepped up or down depending on the voltage characteristic of the line 33 and the point to which coupling 35 is adjusted. The line 33 might be of the order of $\lambda/2$, or a multiple thereof. The coupling 35 may be adjusted to get a step-down transformer action, thus matching low impedance coaxial transmission lines. Preferably, the coupling 35 is adjusted to get the desired match. In arriving at the line length, the reactance of the loop 32 coupling the chamber into the line, the impedance of the loop, the reactance at 35, etc., are considered.

A coaxial line 31′ feeds the generated oscillations to the resonant circuit 50 and to the delay network 90, and thence to electrodes of the tube 60. This feedback circuit is similar in principle and operation to the output circuit line 31, line 33, etc. A two-wire feedback circuit is shown to simplify and facilitate the showing of tube 60 and the direct current circuits therefor. In the feedback circuit numerals similar to the numerals used in connection with the output circuit but primed have been used in so far as possible. The line 31′ and the line 31 may be of any length provided that they are matched at both ends to the impedance into which they feed. In the embodiment being described then line 31′ is matched by auto-transformer 35′ to the impedance effect at coupling 32′ at one end and to the resonant circuit 50 and network 90 at the other end.

The generated ultra high frequency energy is picked up by loop 32′ and supplied by the line 31′ to a resonant circuit 50. These connections include direct current blocking condenser BC since the line 31′ is also coupled to the network 90 and thence to the deflecting electrodes D′P. In a preferred embodiment the resonant circuit 50 takes the form of a high Q cavity resonator. This resonator is preferably made from a low expansion coefficient alloy such as Invar, silver plated on the surface to reduce losses and mounted in a vacuum. The cavity may be of the pill-box type and may be substantially as shown in Fig. 3 of the drawings. The methods of calculating the dimensions of the pill-box are well known to those skilled in the art. For example, the height of the pill-box might equal the radius of the pill-box. For such a cavity the fundamental mode is $\lambda1=2.61$ times the radius. If the box is to resonate in the fundamental mode at a frequency of 3000 megacycles at a wave length of 10 centimeters, the radius of the box should be very close to 3.83 centimeters. The high frequency energy is loosely coupled into the resonator by a loop coupling 40. High frequency energy is diverted from the resonator by a second loop coupling 42 which is loosely coupled to the magnetic field in the resonator. "Probe" couplings may be used at 40 and 42 if desired. The techniques of "probe coupling" to regions of electric field and "loop coupling" to regions of magnetic field are well known to those skilled in the art. The diverted energy is fed from the line 43 to the first pair of deflecting plates DP. The line 31′ also feeds into a delay network 90 which is essentially a transmission line of variable length and has the function of adjusting the phase relation between the voltages on the first deflecting plates DP and the second deflecting plates D′P. This phase adjustment or regulation is carried out by adjusting the length of the telescopic line section. The line 43 also includes a direct current blocking condenser BC and is associated with an impedance matching adjustable line section 35″ which serves the same purpose as the similar line section 35′.

The cathode ray tube 60 is substantially as described in said above mentioned application with these additional features. There is no control grid excited by high frequency energy as in the prior application. The cathode K is connected by lead A to the negative terminal of a direct current source the positive terminal of which is grounded. The anode electrodes A1 and A2 are supplied with relatively positive (with respect to the cathode) potentials by leads B and which connect to points on a potentiometer resistor 64 shunting the direct current source. The beam is formed into a flat sheet by these electrodes and is caused to follow a path which, disregarding for the moment application of the phase displaced radio frequency voltages to the beam deflecting elements, insures that the electron beam falls in equal amounts on the amplifier chains #1 and #2. The cathode ray tube 60 also includes a blocking aperture electrode 66 which may operate at the potential of anode A2 and which preferably takes the form of a metal element or an element with a conductive surface arranged transversely across the path of the beam with a straight edge normal to the effective beam deflecting force. The electrode 66 intercepts all of the beam when the same is deflected in a direction which except for electrode 66 would cause it to fall on say the amplifier chain #1 input. When the beam is at rest it intercepts that portion of the beam only falling on the amplifier chain #1.

The electron multiplier chains #1 and #2 are in arrangement and operation substantially as described in my application mentioned above. The deflecting plates DP are supplied with adjustable direct current potentials by leads E and D. The deflecting plates D′P are similarly supplied with direct current potentials by leads F and G. Each electron multiplier comprises a plurality of stages, in the embodiment illustrated six stages. Each stage has a direct current circuit for applying appropriate operating potential thereto although the anodes of the respective stages may be arranged in series direct current circuits somewhat as in said prior application. In this embodiment leads H, I, J, K, L, M, N, O and P connect the anodes to points on the potentiometer 64 which become less negative or more positive as the number of stages increases. The final stages or collecting electrodes CE and C′E are connected by lines L1 and L2 respectively to the cathodes 13 and 13′ of the oscillation generator 10. The electrodes CE and C′E are also connected to ground by biasing resistors 36 and 36′. The final anodes CE and C′E then operate at potentials which are highly positive relative to the potential on the cathode of tube 60.

In operation, as stated above, when the ultra high frequency voltages on plates DP and D′P are in phase quadrature the beam is interrupted by deflection in one direction at the plates DP so that the beam current is broken up in pulses of equal duration equally spaced as to time when the pulses reach the second plates D′P. With the phase quadrature relation still existing the plates D′P deflect the beam across the amplifier chain inputs so that the same receive pulses of beam current of equal duration and equal time spacing and the amplifiers have current outputs of like average intensity. When this quadrature relation exists the amplifier chains #1 and #2 have equal average current intensity outputs. This is because the transit time in the amplifier-multiplier stages #1 and #2 and the beam tube capacitance effects tend to level off the individual beam pulses interrupted at a radio frequency rate, after several stages of amplification the output current of the amplifier-multipliers #1 and #2 being substantially steady and being substantially proportional to the average input current. The output currents of the amplifier-multipliers are used to entrain or lock in the oscillation generator 10.

The final electron collecting target plates of the multiplier chains of the beam tube 60 are connected to the cathodes 13 and 13′, respectively, over cathode resistances 36 and 36′. The adjacent terminals of the resistances 36 and 36′ are connected to ground to supply potentials to the final collecting electrodes in the electron multiplier amplifiers #1 and #2. At the median condition the cathodes will operate at a direct current positive potential with respect to direct current ground (this means that the grids 15 and 15′ will look negative direct current to the cathodes, and the tubes will be partially biased off). On this direct current potential is superimposed the variations occasioned by frequency compensation.

In operation, the cathode 13 circuit is detuned in such a manner that this tube alone tends to make the oscillator operate at a frequency $f1$, lower than the median operating frequency, and conversely, the cathode 13′ circuit is detuned in such a manner that this tends to make the oscillator operate at a frequency $f2$, higher than the median operating frequency. When the two similar tubes are equally biased the combined system will operate at a frequency midway between $f1$ and $f2$. This is a stable operating point, for should one of the tubes tend to assume control it will automatically bias itself off. As a tube tends to take more than its share of control, the average cathode current will increase, which will increase the bias. With increased bias this tube will have less influence (i. e., its *gm* is lowered) and the other tube will assume its share of control. On the other hand, if the biases on the two tubes are unequal, the frequency of the oscillations generated will shift in such a direction as to favor the tube with the lower grid bias. The maximum frequency deviation will be realized when one of the tubes is biased to cutoff and the other is driven near zero bias. When one tube is at cutoff and the other near zero bias, the cutoff tube will have no control or effect, whereas the near-zero-bias tube will have more than its normal or median point influence. In this event, the frequency of oscillation of the combined system will be that of the near-zero-bias tube alone.

This ultra high frequency oscillator is stabilized in the following manner. Assume first that the ultra high frequency voltages on the plates D′P are in quadrature relation to the ultra high frequency voltages on the plates DP. Then the average outputs of the electron multiplier chains #1 and #2 are equal and equal potentials are applied to the cathodes 13 and 13'. The oscillator operates at a frequency half-way between f1 and f2, or at the desired frequency. Suppose now the frequency of the generated oscillations tends to increase. The quadrature relation of the voltages no longer exists. The phase of the oscillations fed back by the line 90 does not change materially but the phase of the oscillations fed back by the resonator 50 (no longer at resonance) does. The number of electrons arriving at the final collector electrode of one amplifier, say #1, increases and the number of electrons at the final collector electrode of amplifier #2 decreases.

When the current through the electron amplifier-multiplier #1 of tube 60 increases the bias at the cathode end of resistor 36 becomes less positive or more negative. This is the same as making the grid of this section of the oscillator operating at f1, the lower frequency, more effective. At the same time the current through the electron multiplier-amplifier chain #2 decreases and the potential at the cathode end of resistor 36' becomes more positive or less negative. This has the effect of making the grid of this section of the oscillator more negative and less effective in setting the frequency of the operation of the entrained oscillator, which now swings down toward the frequency f1. These changes in current change differentially the biases on the two sections of the oscillator tube 10 so as to increase the effectiveness of the oscillator tube section which tends to operate at f1 and drive the entrained circuit at a lower frequency, and to decrease the effectiveness of the oscillator tube which tends to operate at f2 and drive the entrained circuit at a higher frequency. The frequency of operation at 50 is thus reduced until the energy fed back is at the resonant frequency of resonator 50 and the quadrature phase relation necessary for equal intensity outputs from the two amplifier chains #1 and #2 is reestablished.

In a like manner it may be demonstrated that should the frequency of the generated oscillations tend to decrease, the oscillator tube f2, tending to drive the generator circuit at a higher frequency, will be favored at the expense of the oscillator tube tending to drive the circuit at the lower frequency. This is because when the oscillator slows down the resonant circuit looks like an inductance and relatively retards the phase of the excitation on the first deflecting plates to increase the current through the #2 amplifier chain and decrease the current through the #1 chain to decrease the negative bias on the grid of the oscillator section operating at f2 (the higher frequency) and decrease the effectiveness of the oscillator f1 operating at the lower frequency. The frequency then swings up to establish the desired quadrature relation between the phases of the oscillations on the deflecting plates. Over a limited range these changes in relative effectiveness will be proportional to the changes in bias, that is, the forces tending to restore the phase quadrature relation of the voltages on the deflection plates are proportional to phase shift. Inasmuch as all of these forces are proportional to displacement for small displacements, the controllable frequency oscillator 10 may be expected to operate at a substantially fixed median frequency. In this manner then the entrained oscillator is caused to operate at a substantially constant frequency since any tendency of change in frequency of operation is opposed by the action of the phase discriminator tube 60 as controlled by the phase displaced oscillatory energy fed back to the deflecting plates.

Referring to Fig. 5, inasmuch as the phase changes most rapidly at resonance, small changes in frequency give rise to relatively large changes in phase. High Q resonators of the type described above might have Q's of the order of 5,000 so that deviations in frequency of one part in 100,000 might produce phase shifts of 5 degrees. From practical considerations it appears that 5 degrees deviation might be the upper limit of sensitivity, whereas 20 degrees deviation is a more probable operating value. For the case of Q=5,000, this would correspond to frequency control to one part in 25,000.

Another important feature of this device lies in the fact that if the electron-multiplier chains provide sufficient gain, very little energy need be transferred through the high Q resonator. To provide high Q and constancy of the resonant frequency, the high Q resonator cavity might be made from a low-expansion-coefficient-alloy such as Invar, silver plated on the surface to reduce losses, and the entire cavity might be mounted in a vacuum to minimize the effects of pressure and humidity variations. Such a high Q resonator might be used for frequency control at U. H. F. in much the same manner as crystals are used at lower frequencies.

What is claimed is:

1. A tube structure comprising, an electron beam source, a target for electrons from said source, said target comprising the input stages of two electron amplifiers to be excited by electrons from said source, two sets of deflecting elements adjacent the path of said beam which when excited deflect the beam from its path, an electrode between said two sets of deflecting elements for blocking said beam when deflected in one direction, and means for coupling an output circuit to said electron amplifiers.

2. A tube structure comprising, an electron source, electrodes for forming electrons from said source into a flat beam, a target for said electron beam comprising the input stages of two electron amplifier chains symmetrically located in the path of said beam, two sets of deflecting elements adjacent the path of said beam which when excited by alternating current deflect the beam from a straight path to said electron amplifier input stages, an additional electrode located between said two sets of deflecting elements and arranged to block the beam when it is deflected in one direction, and output terminals connected to the final stages of said electron amplifier chains.

3. A phase discriminator including, a tube having an electron beam producing electrode, two anode electrodes to be excited by said beam, two sets of deflecting elements spaced along the path of said beam, two circuits for applying two alternating currents of like frequency and of changeable phase to corresponding sets of deflecting elements, a phase shifting element in one of said circuits for establishing a phase displaced relation between the two alternating currents applied to the corresponding sets of deflecting elements, a beam blocking electrode extending into the path between said first electrode and one only of said electrodes, and means for utilizing the difference of the outputs from said anode electrodes.

4. In apparatus for detecting phase differences between two currents of substantially the same frequency the relative phases of which may vary, an electron discharge tube structure comprising a beam producing electrode, a target for said beam including two output electrodes symmetrically related to the normal path of said beam, two sets of deflecting elements adjacent the path of said beam for setting up beam displacing forces which are in parallel directions, a beam blocking electrode extending into the path of said beam, a circuit for applying one of said currents to one set of said deflecting elements, a circuit for applying the other of said currents to the other set of said deflecting elements, a phase shifter in one of said circuits, and an output circuit wherein the difference of the outputs from said output electrodes appears.

5. In apparatus for detecting phase differences between two currents of substantially the same frequency the relative phases of which may vary, separate corresponding circuits wherein two currents of the character described above appear, an electron discharge tube structure comprising a beam producing electrode, a target for said electrode comprising the input stages of two electron amplifier chains in the path of said beam, two sets of deflecting elements adjacent the path of said beam for setting up beam displacing forces which are in parallel directions, a beam blocking electrode extending into the path of said beam, a coupling between one of said circuits and one set of deflecting elements for applying one of said two currents to said one set of deflecting elements, a coupling between the other of said circuits and the other set of deflecting elements for applying the other of said two currents to said other set of deflecting elements, and an output circuit differentially coupled to said amplifier chains.

6. Means for generating oscillations of substantially constant frequency including, an oscillation generator having an electron discharge tube system with electrodes in an oscillation generating circuit the frequency of operation of which depends on electrode potential, a phase detector having two sets of control electrodes and having output electrodes in a circuit including an impedance wherein a direct current potential is developed when detection takes place, a resonant circuit coupling said oscillation generator to one set of control electrodes of said phase detector, a second coupling between said generator and the other set of control electrodes of said phase detector, a phase shifting network in one of said couplings, a connection between electrodes of said discharge tube system and said impedance wherein said potential is developed for controlling the frequency of operation of said generator, and an output circuit coupled to said generator.

7. Means for generating oscillations of substantially constant frequency including, an oscillation generator having an electron discharge tube system with electrodes in an oscillation generating circuit the frequency of operation of which depends on electrode potential, a phase detector having two sets of control electrodes and having output electrodes in a circuit including an impedance wherein a potential is developed of a magnitude depending on the phase relation of two alternating currents applied to corresponding sets of control electrodes, a resonant circuit coupling said oscillation generator to one set of control electrodes of said phase detector, a phase shifting network coupling said oscillation generator to the other set of said control electrodes, a connection between at least one electrode of said discharge tube system and said impedance wherein said potential is developed for controlling the frequency of operation of said generator, and an output circuit coupled to said generator.

8. In an electrical system, an oscillation generator, control apparatus therefor including, a tube having an electron beam producing electrode, two output electrodes to be excited by said beam, two sets of deflecting elements adjacent the path of said beam, circuits for applying two alternating currents, the relative phases of which vary when the generator frequency changes, from the generator to corresponding sets of deflecting elements, a phase shifter in one of said circuits, a beam blocking electrode extending into the path between said first electrode and one of said output electrodes, and means for utilizing the difference of the outputs from said output electrodes to control the frequency of operation of said generator.

9. In oscillation generating apparatus, a high frequency oscillation generator, and apparatus for controlling its frequency of operation including, a tube of the beam type having two sets of deflecting elements spaced along the beam path and two output electrodes symmetrically located relative to the path of the beam, connections for applying voltage representative of the generated oscillations to one set of deflecting elements to sweep the beam back and forth across said output electrodes, connections for applying voltage representative of the generated oscillations to the other set of deflecting elements to vary the beam with respect to said one set of deflecting elements, a resonant circuit in one of said connections, and connections from said output electrodes to said oscillation generator for controlling its frequency of operation by the differential of the outputs from the two output electrodes.

10. In apparatus for generating oscillatory energy of substantially constant fixed mean frequency, an oscillation generator including two electron discharge tubes having electrodes included differentially in an oscillation generating circuit the frequency of operation of which depends upon electrode potentials, an electron discharge device having an electron producing electrode, a blocking aperture electrode, a pair of deflecting elements between said electron producing electrode and blocking aperture, a target comprising symmetrically arranged chains of amplifier electrodes, a second pair of deflecting elements between said blocking aperture electrode and said target, couplings between the amplifier chain outputs and corresponding electrodes in said generator, a first path coupling said generator to one pair of said deflecting elements, and a second path including a resonant circuit coupling said generator to the other pair of deflecting elements of said electron discharge device.

11. In a system for generating oscillatory energy and stabilizing the mean frequency thereof, an oscillation generator including a pair of electron discharge devices each having electrodes coupled in an oscillation generating circuit, one of which circuits is arranged to operate at a first frequency and the other of which circuits is arranged to operate at a second and different frequency, means in said circuits entraining said oscillators to operate at a common frequency, a phase detector including an electron beam tube structure having two sets of deflecting elements located along the path of said beam to apply thereto deflection forces which are in parallel, an aperture blocking electrode extending into the path of said beam to block the said beam substantially completely when deflected in one direction, two chains of amplifier electrodes symmetrically located with respect to the normal path of said beam in said tube, a resonant circuit coupling said oscillation generator to one set of deflecting elements, a phase shifting network coupling the oscillation generator to the other set of deflecting elements, and a coupling between the final electrode of each of said amplifier chains and corresponding electrodes in different ones of said discharge devices of said oscillation generator.

RUSSELL ROBIN LAW.

REFERENCES CITED

The following references are of record in the file of this patent:

UNITED STATES PATENTS

| Number | Name | Date |
|---|---|---|
| 2,011,260 | Prinz | Aug. 13, 1935 |
| 2,205,071 | Skellett | June 18, 1940 |
| 2,294,659 | Herold | Sept. 1, 1942 |
| 2,340,432 | Schock | Feb. 1, 1944 |
| 2,419,696 | Smith | Apr. 29, 1947 |